(12) United States Patent
Braedt

(10) Patent No.: US 8,911,314 B2
(45) Date of Patent: Dec. 16, 2014

(54) MULTIPLE SPROCKET ASSEMBLY

(75) Inventor: Henrik Braedt, Hambach (DE)

(73) Assignee: SRAM Deutschland GmbH (DE)

( * ) Notice: Subject to any disclaimer, the term of this patent is extended or adjusted under 35 U.S.C. 154(b) by 751 days.

(21) Appl. No.: 12/564,889

(22) Filed: Sep. 22, 2009

(65) Prior Publication Data

US 2010/0075791 A1    Mar. 25, 2010

(30) Foreign Application Priority Data

Sep. 22, 2008  (DE) .......................... 10 2008 048 371

(51) Int. Cl.
*F16H 55/30*    (2006.01)
*B62M 9/10*    (2006.01)

(52) U.S. Cl.
CPC ..................................... *B62M 9/10* (2013.01)
USPC ......................................................... 474/160

(58) Field of Classification Search
CPC ...................................................... B62M 9/10
USPC .......................................... 474/160; 280/260
See application file for complete search history.

(56) References Cited

U.S. PATENT DOCUMENTS

| | | | |
|---|---|---|---|
| 5,503,600 A | 4/1996 | Berecz | |
| 5,980,407 A | 11/1999 | Takamori et al. | |
| 2005/0009654 A1 | 1/2005 | Kanehisa et al. | |
| 2008/0058144 A1 | 3/2008 | Oseto et al. | |
| 2008/0132367 A1 | 6/2008 | Braedt | |
| 2009/0243250 A1 * | 10/2009 | Chiang | 280/260 |

FOREIGN PATENT DOCUMENTS

| | | |
|---|---|---|
| DE | 10 2007 006 852 A1 | 4/2008 |
| DE | 10 2006 057 168 A1 | 6/2008 |
| DE | 20 2008 004 243 U1 | 6/2008 |
| EP | 1 964 769 A2 | 9/2008 |
| FR | 2 611 642 A1 | 9/1988 |

* cited by examiner

*Primary Examiner* — William E Dondero
*Assistant Examiner* — Robert T Reese
(74) *Attorney, Agent, or Firm* — Milan Milosevic; Lisa Serdynski; Steven Courtright

(57) ABSTRACT

A multiple sprocket assembly configured to be mounted to a wheel hub. The multiple sprocket assembly includes a truncated conical shell having a first opening proximate a small shell base and a second opening proximate a large shell base. The openings are coaxial with a central axis. A plurality of tooth sprockets having different numbers of chain-engaging teeth is disposed on the shell and extends radially of the central axis. A radial load transmitting profile is configured on the shell proximate one of the small and large shell bases. A torque load transmitting profile is configured on the shell proximate the large shell base. The shell, sprockets and the radial and torque load transmitting profiles embody a single piece. A load transfer element is connected to the large shell base to radially support the shell. The load transfer element has a greater number of chain-engaging teeth disposed on an outer periphery thereof and having a larger diameter than a largest sprocket on the shell.

16 Claims, 5 Drawing Sheets

MULTIPLE SPROCKET ASSEMBLY

BACKGROUND OF THE INVENTION

The present invention relates to multiple sprocket assemblies, and more particularly, to a multiple sprocket assembly having a single-piece truncated conical shell with a plurality of sprockets and a load transfer element connected to a large base of the shell.

FIGS. 1, 2a and 2b show a conventional multiple sprocket assembly including a truncated conical shell 40 and a cap member 42 mountable to a hub driver mechanism 54 of a wheel hub 56. The cap member 42 includes a torque and radial transmitting profile 44 at its outer periphery, the profile 44 matingly received by a similar profile 46 on the conical shell 40. The profile 46 on the conical shell 40 is disposed radially inwardly of the chain-engaging teeth 48 at the periphery of the conical shell 40. The teeth 48 of the largest sprocket on the shell 40 are only supported axially at the outboard side by a cylindrical support element 50, unlike chain-engaging teeth 52 at a smaller diameter sprocket which are axially supported on both the inboard and outboard sides. Accordingly, the teeth 48 of the largest diameter sprocket are less stable and more prone to bending toward the smaller adjacent sprocket under chain loading.

SUMMARY OF THE INVENTION

The present invention provides a multiple sprocket assembly mountable to a wheel hub. The multiple sprocket assembly includes a hollow conical shell having a first opening proximate a small shell base and a second opening proximate a large shell base. The openings are coaxial with a central axis of the shell. A plurality of tooth sprockets have different numbers of chain-engaging teeth disposed on the truncated conical shell and extend radially of the central axis. A radial load transmitting profile is configured on the shell proximate one of the small and large shell bases. A torque load transmitting profile is configured on the shell proximate the large shell base. The truncated conical shell, the toothed sprockets and the torque and radial load transmitting profiles embody a single piece. A load transfer element is connected to the large shell base to radially support the shell. The load transfer element has a greater number of chain-engaging teeth disposed on an outer periphery thereof and has a larger diameter than a largest adjoining sprocket on the shell.

In one embodiment of the present invention, the multiple sprocket assembly includes a hub-receiving opening having a torque load transmitting profile for transmitting torque to the wheel hub. The large shell base includes axially-extending connecting pins connected to openings in the load transfer element. The connecting pins are press-fit into the openings in the load transfer element. The load transfer element has a generally circular cross section. The connecting pins include beveled ends. The axially-extending connecting pins have cross sections that are generally rectangular with four rounded corners. The axially-extending connecting pins have shoulders shaped to provide a predetermined axial spacing between the chain-engaging teeth on the largest sprocket of the shell and the chain-engaging teeth on the load transfer element. The load transfer element includes weight-reducing openings shaped to form arms inclined generally radially outwardly in a direction opposite to a drive rotational direction of the load transfer element.

These and other features and advantages of the present invention will be more fully understood from the following description of one or more embodiments of the invention, taken together with the accompanying drawings.

DETAILED DESCRIPTION

Figure 3:
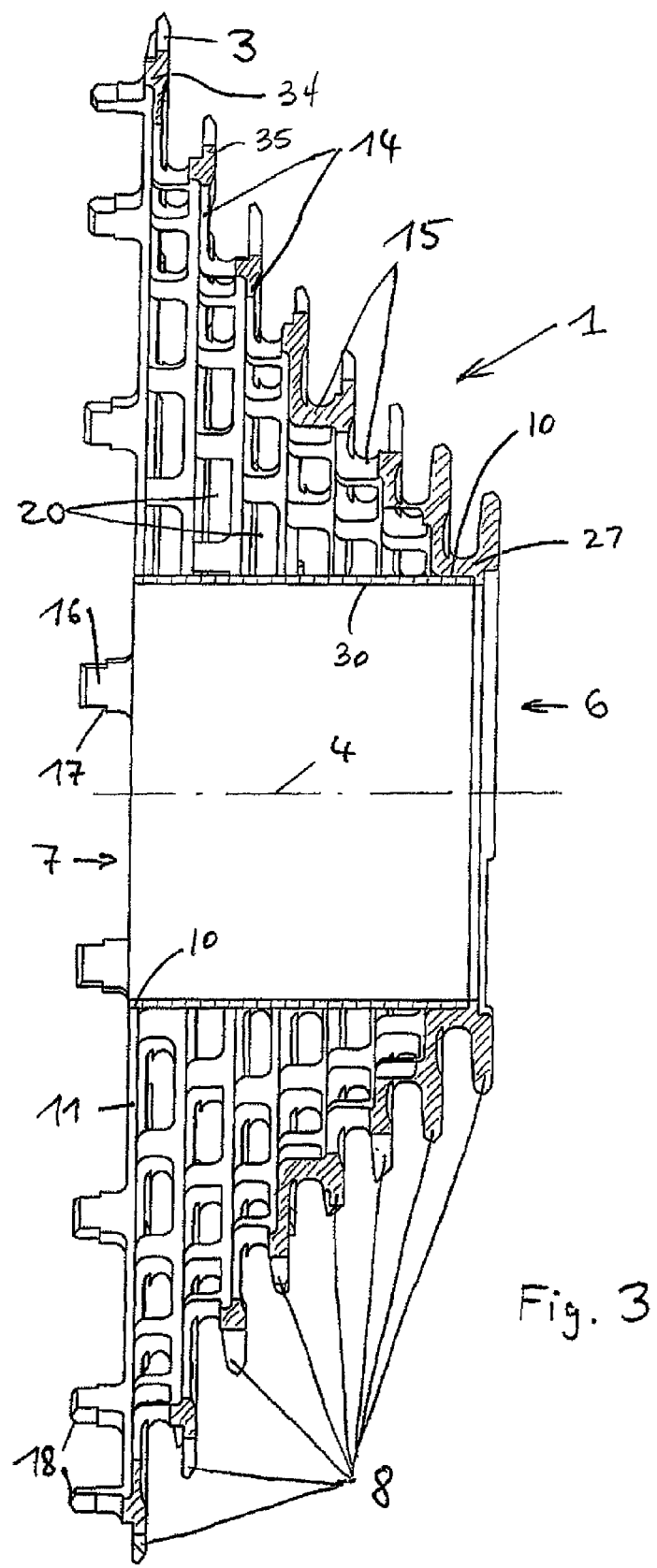
FIG. 3 is a cross-sectional view of a truncated conical shell of a multiple sprocket assembly according to one embodiment of the present invention and a discrete cylindrical sleeve for axially receiving a hub.
Figure 4:
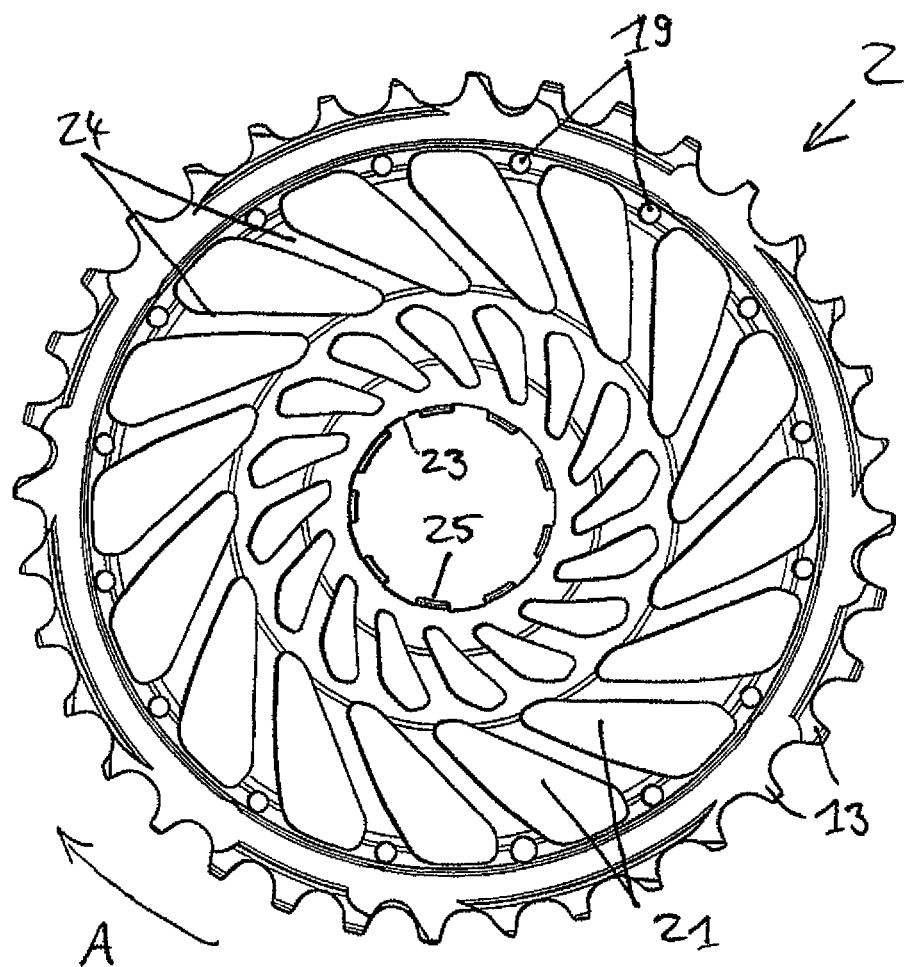
FIG. 4 is a end view of a load transfer element of the multiple sprocket assembly.
Figure 5:
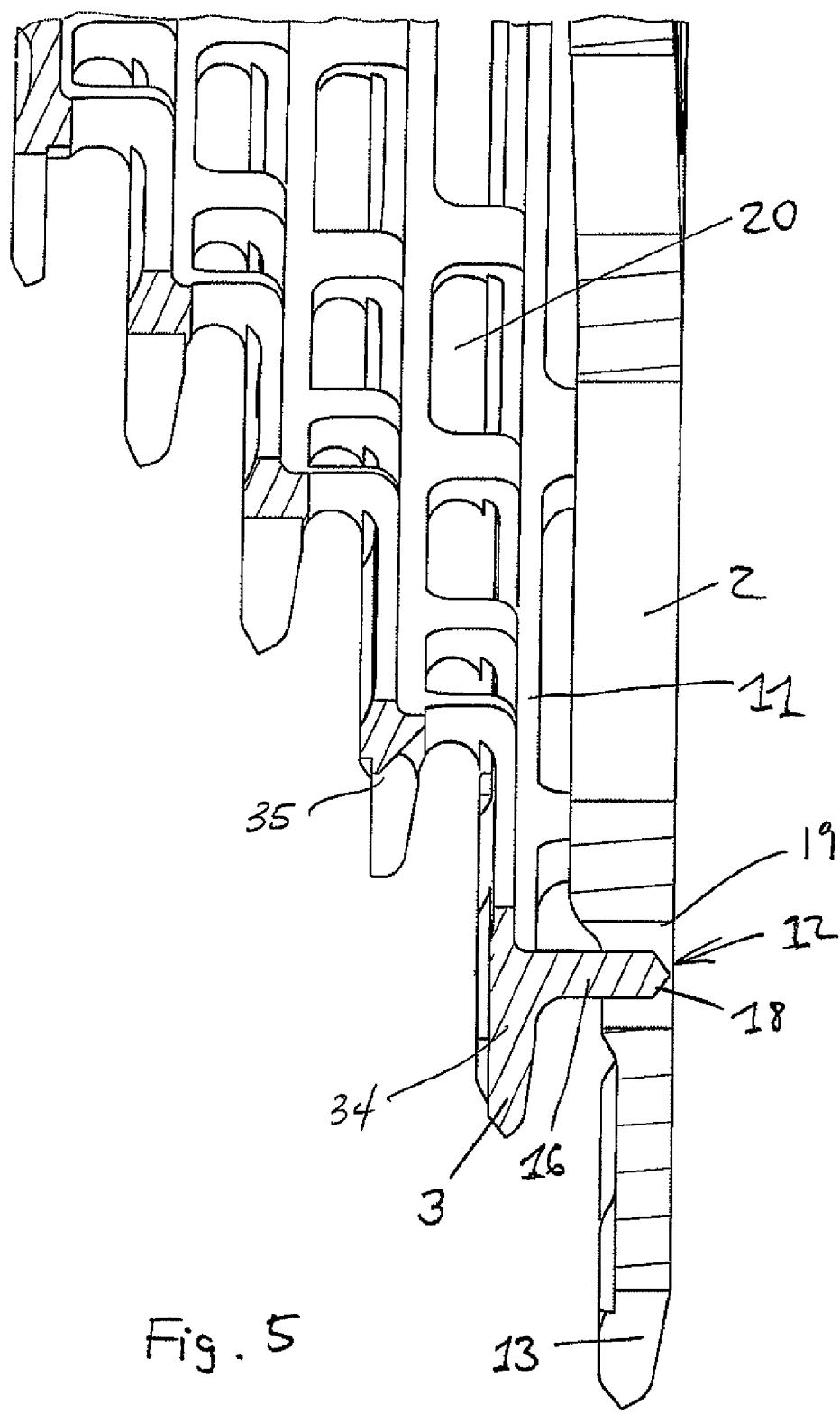
FIG. 5 is a partial cross-sectional view of the multiple sprocket assembly showing the truncated conical shell connected to the load transfer element.

FIGS. 3-5 illustrate a multiple sprocket assembly mountable to a wheel hub according to one embodiment of the present invention. The multiple sprocket assembly generally includes a truncated conical shell 1, a plurality of toothed sprockets 8, torque and radial load transmitting profiles 16, 10 and a load transfer element 2. The truncated conical shell 1, toothed sprockets 8 and the torque and radial load transmitting profiles 16, 10 embody a single piece. The single-piece construction may be achieved by any number of manufacturing processes, including for example, forming, casting, forging, or machining. The toothed sprockets 8 have different diameters and different number of chain-engaging teeth. The sprockets 8 are disposed radially on the shell 1 relative to a central axis 4 of the shell 1.

In the embodiment shown, the shell 1 has a stepped configuration. However, the shell 1 may assume any linear or nonlinear shape that properly positions the toothed sprockets 8 to receive a chain. In the stepped embodiment shown, the shell 1 includes a plurality of coaxial annular discs 14 of variable diameter extending radially of the central axis 4 and a plurality of coaxial annular cylinders 15 of variable diameter extending along the central axis 4. The discs 14 and cylinders 15 are alternatingly arranged in a stepped sequence to form the truncated conical shell 1. Openings 20 extend through the discs 14 and cylinders 15 to allow dirt to pass through the truncated conical shell 1. Alternatively, the discs 14 and cylinders 15 may be solid.

Figure 1:
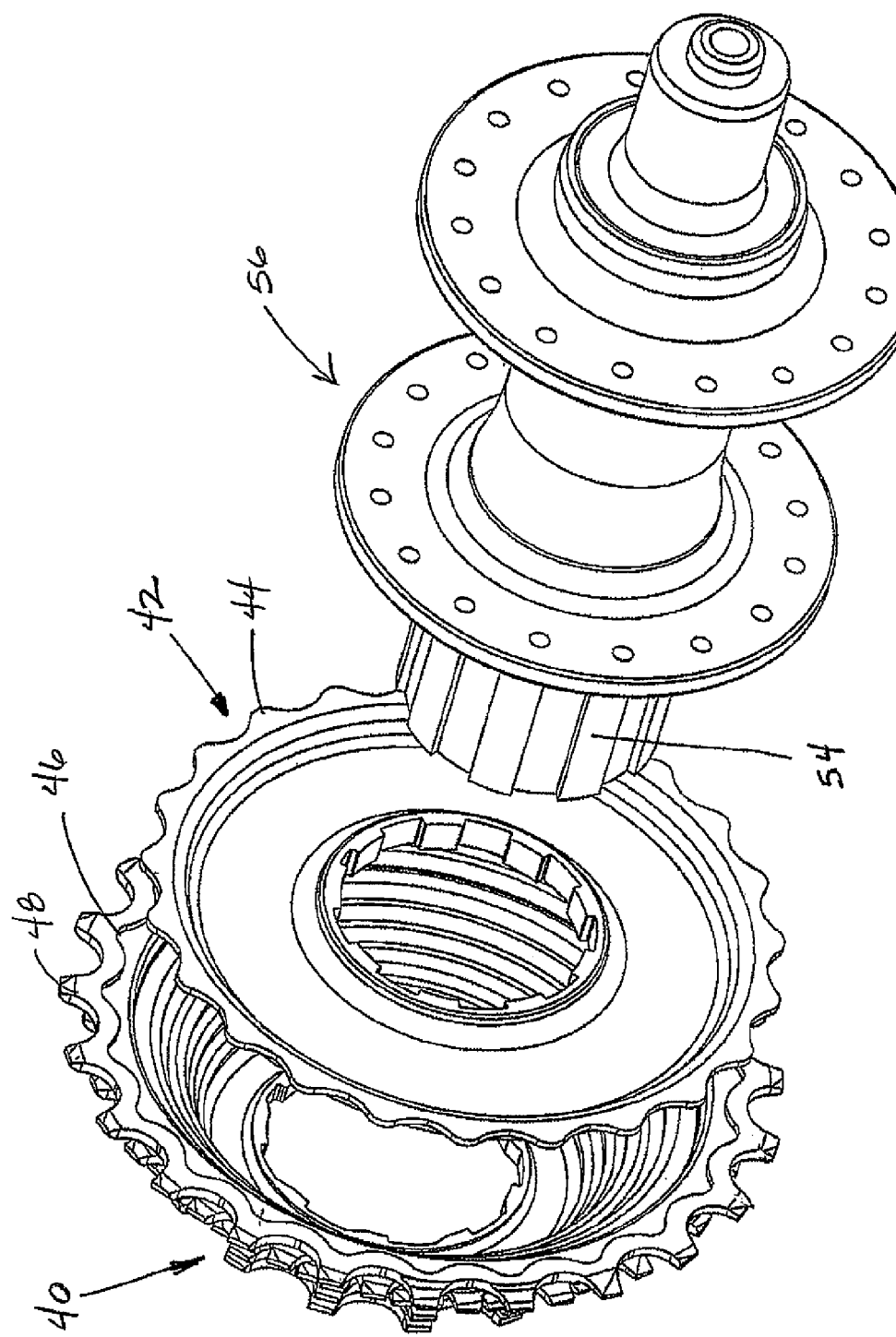
FIG. 1 is an exploded isometric view of a prior art multiple sprocket assembly adjoining a wheel hub.
Figure 2B:
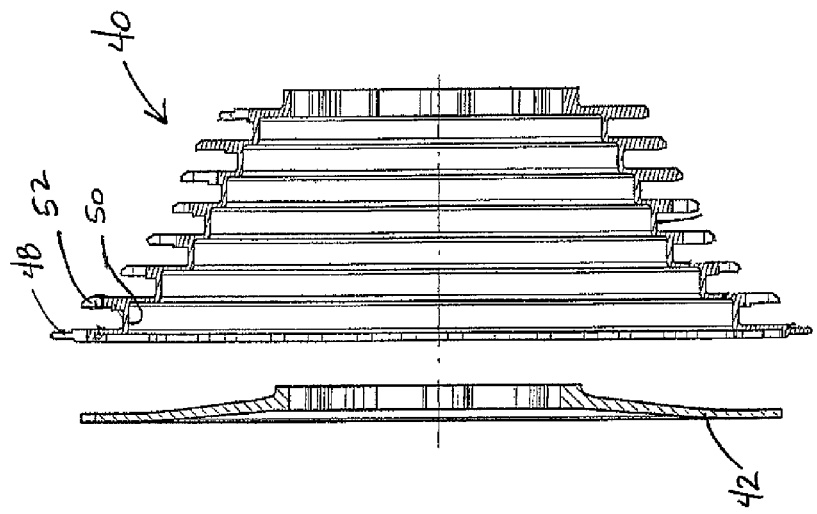
FIG. 2b is an exploded cross-sectional view of the prior art multiple sprocket assembly of FIG. 1.
Figure 2A:
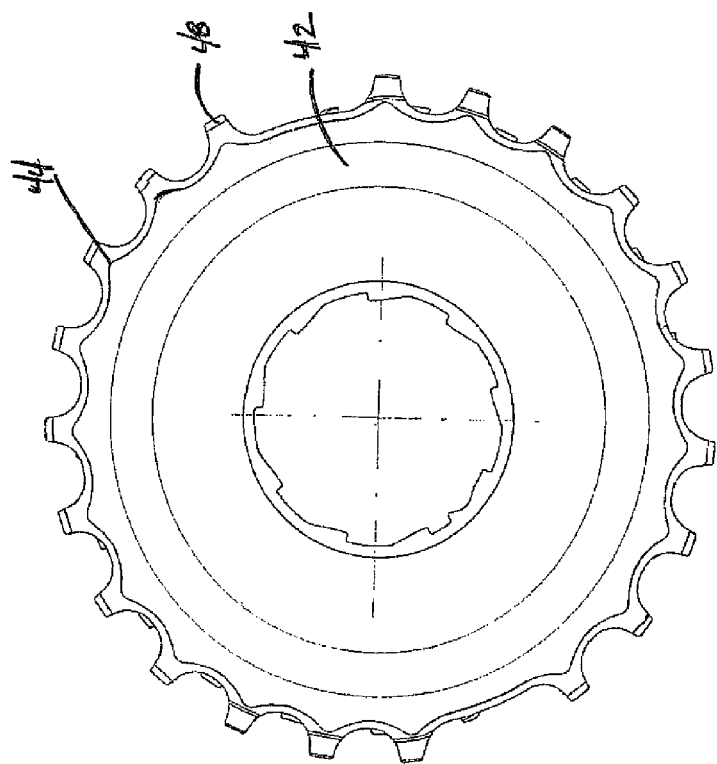
FIG. 2a is an inboard end view of the prior art multiple sprocket assembly of FIG. 1.

The shell 1 further includes a first opening 6 at a small shell base 27 and a second opening 7 at a large shell base 11. The first and second openings 6, 7 are coaxial with and substantially perpendicular to the central axis 4. The shell 1 includes the radial load transmitting profiles 10 at the small and large shell bases 27, 11 for supporting the shell 1 by a hub driver mechanism of the wheel hub similar to hub driver mechanism shown in FIG. 1. The shell 1 includes the torque load transmitting profile, in this embodiment axially-extending connecting pins 16, at the large shell base 11. Further, in FIG. 3, a discrete cylindrical sleeve 30 for receiving a hub may be axially disposed between the first and second openings 6, 7 of the shell 1.

Looking to FIGS. 4 and 5, the load transfer element 2 is connected to the large shell base 11 to radially support the shell 1 and to transmit torque from the shell 1 to the hub driver mechanism of the wheel hub. The load transfer element 2 includes a hub-receiving opening 23, the opening 23 including torque and radial load transmitting profile 25 for transmitting torque and radial loading to the hub driver mechanism. The load transfer element 2 includes openings 19 configured to receive the axially-extending connecting pins 16 from the large shell base 11. The load transfer element 2 includes a greater number of chain-engaging teeth 13 disposed on an outer periphery thereof and having a larger diameter than a largest adjoining sprocket 34. The openings 19 and the connecting pins 16 form a connection 12 providing axial support on the inboard side of teeth 3 on a largest sprocket 34 on the shell 1 (see FIG. 5). Accordingly, the teeth 3 are supported on both their inboard and outboard sides to stabilize the teeth and resist bending of the teeth toward a smaller adjacent sprocket 35 under chain loading. Further, the connection 12 may be detachable or non-detachable.

The connecting pins 16 have beveled ends 18 for facilitating insertion of the pins 16 into the openings 19 on the load transfer element 2. Alternatively, the openings 19 may be countersunk to matingly receive a connecting pin 16. The connecting pins 16 also include stops or shoulders 17 to ensure precise axially spacing between chain-engaging teeth 13 on the load transfer element 2 and the chain-engaging teeth 3 of the largest sprocket 34 on the shell 1. The generally circular opening 19 is configured to form a press-fit with a cross-section of the connecting pin 16, in this embodiment, the pin cross section is generally rectangular with four rounded corners. Any number of alternative press-fit configurations between the connecting pin 16 and the opening 19 may be formed including interlocking peripheral grooves and beads.

The load transfer element 2 includes weight-reducing openings 21. The weight-reducing openings 21 are shaped to form arms 24 inclined generally radially outwardly in a direction opposite to a drive rotational direction A of the load transfer element thereby loading the arms 24 substantially in compression.

While this invention has been described by reference to an embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A multiple sprocket assembly mountable to a wheel hub, the multiple sprocket assembly comprising:
    a truncated conical shell having a first opening proximate a small shell base and a second opening proximate a large shell base thereof, the first and second openings coaxial with a central axis of the truncated conical shell;
    a plurality of toothed sprockets having different numbers of chain-engaging teeth disposed on the truncated conical shell and extending radially of the central axis and radially from the truncated conical shell;
    a radial load transmitting profile configured on the shell proximate one of the small and large shell bases,
    a torque load transmitting profile configured on the truncated conical shell proximate the large shell base,
    a single-piece element including the truncated conical shell, the toothed sprockets and the radial and torque load transmitting profiles; and
    a load transfer element connected to the large shell base to radially support the truncated conical shell, the load transfer element having a greater number of chain-engaging teeth disposed on an outer periphery thereof and having a larger diameter than a largest adjoining sprocket on the shell, the large shell base disposed between the largest adjoining sprocket and the load transfer element, whereby torque from the plurality of toothed sprockets disposed on the truncated conical shell is transferred to the torque load transmitting profile through the truncated conical shell.

2. The multiple sprocket assembly according to claim 1 wherein the load transfer element includes a hub-receiving opening having a torque load transmitting profile for transmitting torque to the wheel hub.

3. The multiple sprocket assembly according to claim 2 wherein the large shell base includes axially-extending connecting pins connected to openings in the load transfer element.

4. The multiple sprocket assembly according to claim 3 wherein the connecting pins are press-fit into the openings in the load transfer element.

5. The multiple sprocket assembly according to claim 4 wherein the load transfer element has a generally circular cross section.

6. The multiple sprocket assembly according to claim 3 wherein the axially-extending connecting pins include beveled ends.

7. The multiple sprocket assembly according to claim 6 wherein the axially-extending connecting pins have cross sections that are generally rectangular with four rounded corners.

8. The multiple sprocket assembly according to claim 7 wherein the connecting pins have shoulders shaped to provide a predetermined axial spacing between the chain-engaging teeth on the largest sprocket of the shell and the chain-engaging teeth on the load transfer element.

9. The multiple sprocket assembly according to claim 8 wherein the load transfer element includes weight-reducing openings.

10. The multiple sprocket assembly according to claim 9 wherein the weight-reducing openings are shaped to form arms inclined generally radially outwardly in a direction opposite to a drive rotational direction of the load transfer element.

11. The multiple sprocket assembly according to claim 1 wherein the load transfer element includes weight-reducing openings.

12. The multiple sprocket assembly according to claim 11 wherein the weight-reducing openings are shaped to form arms inclined generally radially outwardly in a direction opposite to a drive rotational direction of the load transfer element.

13. The multiple sprocket assembly according to claim 1 wherein the large shell base includes axially-extending connecting pins connected to openings in the load transfer element.

14. The multiple sprocket assembly according to claim 13 wherein the axially-extending connecting pins include beveled ends.

15. The multiple sprocket assembly according to claim 14 wherein the axially-extending connecting pins have cross sections that are generally rectangular with four rounded corners.

16. The multiple sprocket assembly according to claim 15 wherein the connecting pins have shoulders shaped to provide a predetermined axial spacing between the chain-engaging teeth on the largest sprocket of the shell and the chain-engaging teeth on the load transfer element.

* * * * *